United States Patent
Schaeffer

(10) Patent No.: US 9,051,055 B2
(45) Date of Patent: Jun. 9, 2015

(54) SYSTEM AND METHOD OF ADAPTIVELY GOVERNING ROTOR SPEED FOR OPTIMAL PERFORMANCE

(71) Applicant: Bell Helicopter Textron Inc., Forth Worth, TX (US)

(72) Inventor: Joseph M. Schaeffer, Cedar Hill, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 197 days.

(21) Appl. No.: 13/789,034

(22) Filed: Mar. 7, 2013

(65) Prior Publication Data

US 2014/0252158 A1   Sep. 11, 2014

(51) Int. Cl.
*B64D 31/06* (2006.01)
*B64C 27/04* (2006.01)
*B64C 27/57* (2006.01)

(52) U.S. Cl.
CPC ............... *B64D 31/06* (2013.01); *B64C 27/04* (2013.01); *B64C 27/57* (2013.01)

(58) Field of Classification Search
USPC ...................................................... 244/17.13
See application file for complete search history.

(56) References Cited

U.S. PATENT DOCUMENTS

| | | | | |
|---|---|---|---|---|
| 5,265,825 | A * | 11/1993 | Ebert et al. ................ | 244/17.13 |
| 6,065,451 | A * | 5/2000 | Lebrun ......................... | 123/454 |
| 7,147,182 | B1 * | 12/2006 | Flanigan ...................... | 244/6 |
| 2002/0189229 | A1 * | 12/2002 | Hidaka et al. .............. | 60/39.182 |
| 2004/0010354 | A1 * | 1/2004 | Nicholas et al. ............ | 701/4 |
| 2007/0212223 | A1 * | 9/2007 | Moffitt et al. ............. | 416/134 A |
| 2013/0054053 | A1 | 2/2013 | Greenfield et al. | |
| 2014/0252158 | A1 * | 9/2014 | Schaeffer ................... | 244/17.13 |

FOREIGN PATENT DOCUMENTS

| | | |
|---|---|---|
| EP | 1310646 A2 | 5/2003 |
| WO | 99/50729 A1 | 10/1999 |

OTHER PUBLICATIONS

European Office Action in related European Application No. 13171079.0, dated Mar. 7, 2014, 6 pages.
European Search Report in related European Application No. 13171079.0, dated Feb. 12, 2014, 3 pages.
Joseph M. Schaeffer et al, Operating Procedures and Control Laws for Transport Category Performance in the Bell-Agusta 609 Tiltrotor, exact date unknown, 11 pages.

* cited by examiner

*Primary Examiner* — Bhavesh V Amin
(74) *Attorney, Agent, or Firm* — Noah A. Tevis

(57) ABSTRACT

The system for adaptively governing a speed of a rotor assembly in an aircraft can include a processor configured for comparing receivable data to limit data in an algorithm and subsequently making one or more commands that affect the speed of the rotor assembly, the algorithm being configured for analyzing power available during operation of the aircraft. The method can include calculating a first power available by comparing an actual transmission torque to a transmission torque limit; calculating a second power available by comparing an actual engine exhaust temperature to an engine exhaust temperature limit; and comparing the first power available to the second power available.

18 Claims, 5 Drawing Sheets

SYSTEM AND METHOD OF ADAPTIVELY GOVERNING ROTOR SPEED FOR OPTIMAL PERFORMANCE

BACKGROUND

1. Technical Field

The present disclosure relates to a system and method adaptively governing a rotor speed for optimal performance of an aircraft.

2. Description of Related Art

Conventionally, rotorcraft operated at an optimal rotor speed throughout the flight regime. Subsequently, variable rotor speed rotorcraft have been developed to a limited extent. Variable rotorcraft have been limited to certain settings, such as a "high performance" setting in which the pilot could have the rotor speed increased in a high altitude and/or hot ambient condition. In addition, a "quiet mode" setting could be chosen to reduce rotor speed in order to reduce aircraft noise in forward flight.

However, there is a need for a system and method for the governing of rotor speed in order to optimize performance of the aircraft.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
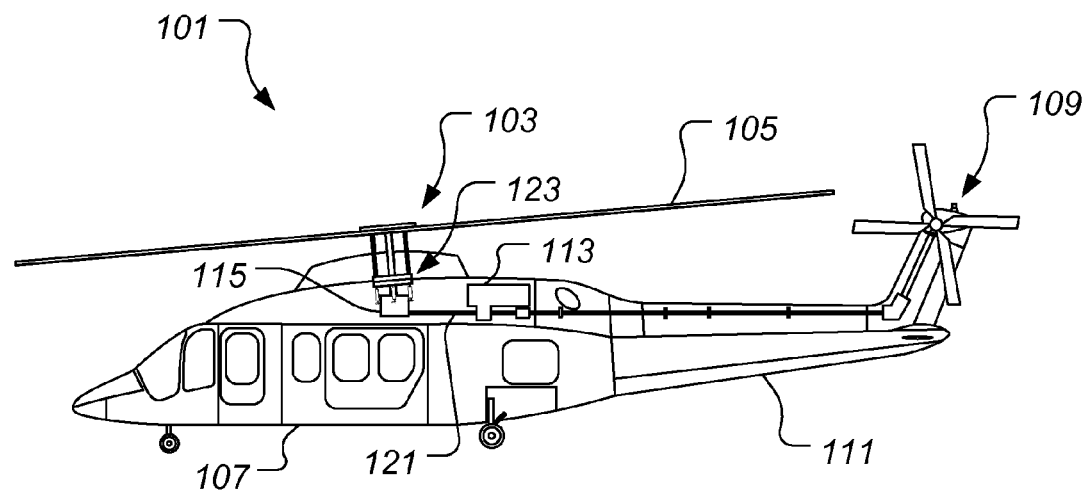
FIG. 1 is a side view of an rotorcraft, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. For example, a swashplate mechanism 123 can be used to collectively and/or cyclically change the pitch of rotor blades 105. Rotorcraft 101 further includes a fuselage 107, anti-torque system 109, and an empennage 111. Torque is supplied to rotor system 103 and anti-torque system 109 with at least one engine 113. A main rotor gearbox 115 is operably associated with an engine main output driveshaft 121 and the main rotor mast.

Figure 2:
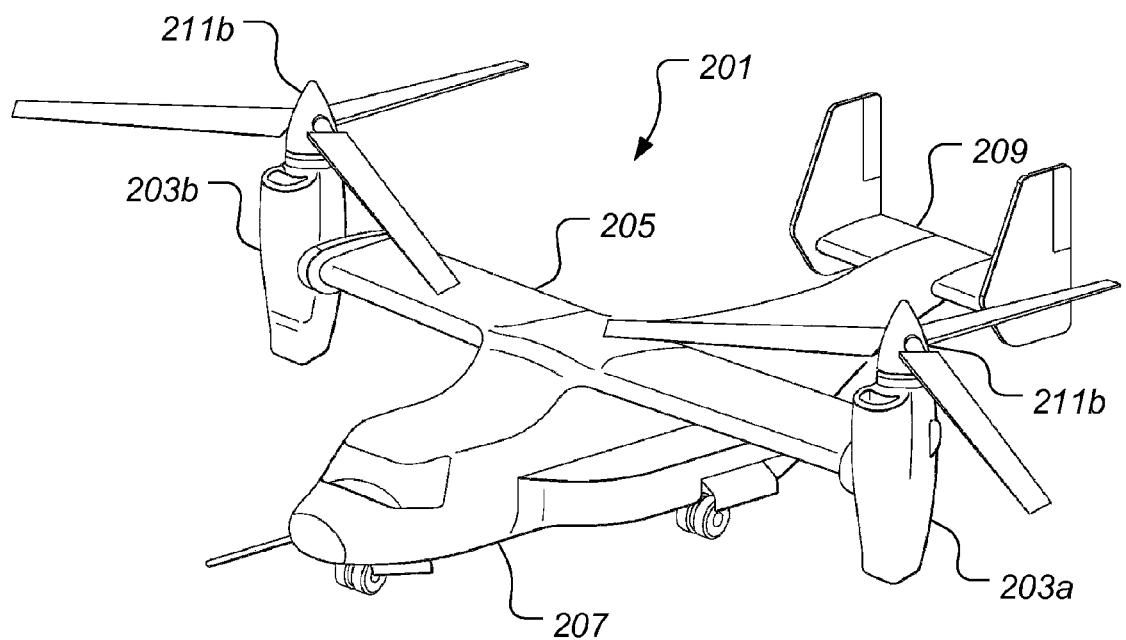
FIG. 2 is a perspective view of a tilt rotor aircraft, according to one example embodiment.

Referring now also to FIG. 2 in the drawings, a tilt rotor aircraft 201 is illustrated. Tilt rotor aircraft 201 can include nacelles 203a and 203b, a wing 205, a fuselage 207, and a tail member 209. Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal.

Rotorcraft 101 and tilt rotor aircraft 201 are merely illustrative of the wide variety of aircraft and vehicles that are particularly well suited to take advantage of the method and system of the present disclosure. It should be appreciated that other aircraft can also utilize the method and system of the present disclosure to optimize performance.

Figure 3:
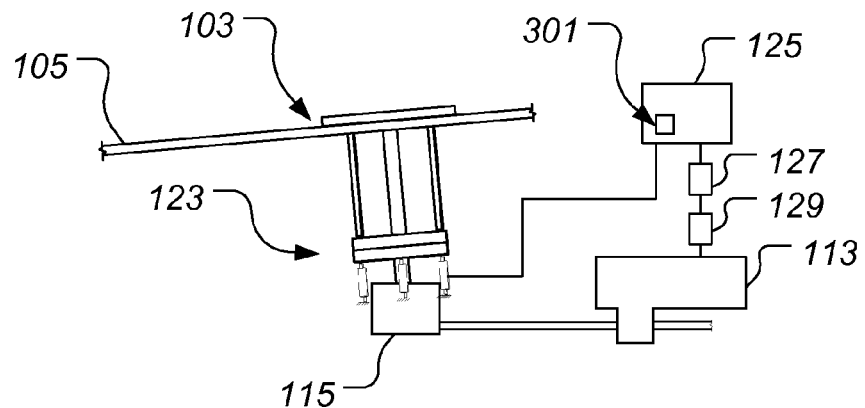
FIG. 3 is a partial stylized view of an aircraft with a system for calculating and commanding the rotor to an optimal rotor speed, according to one example embodiment.
Figure 4:
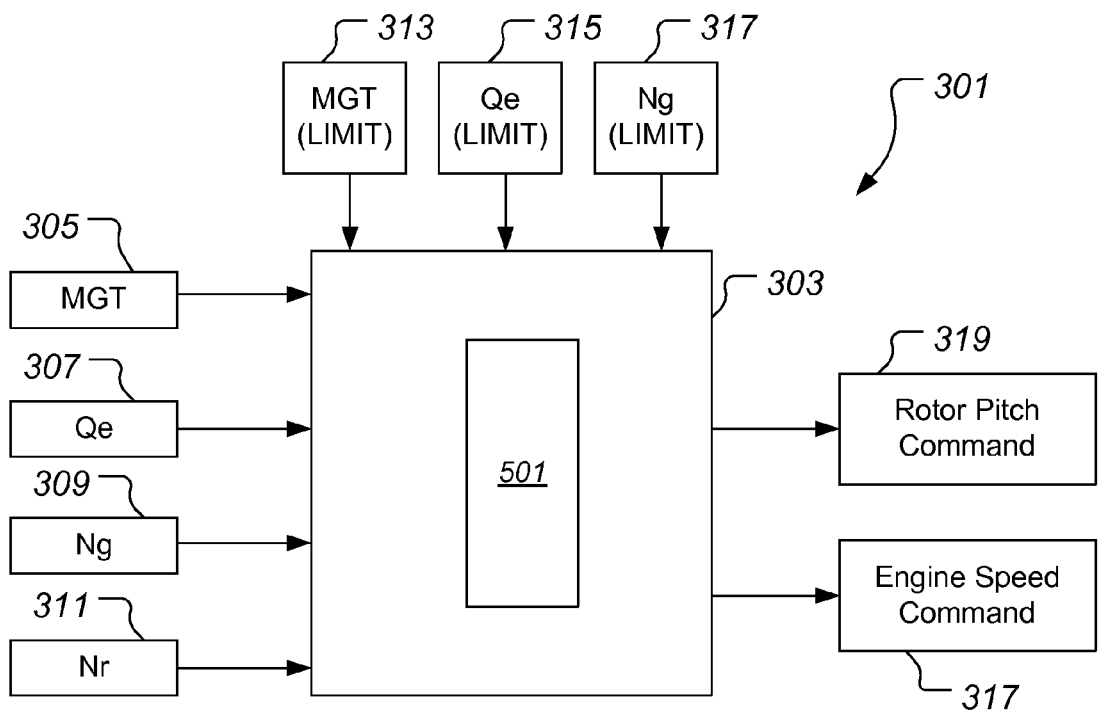
FIG. 4 is a schematic view of the system for calculating and commanding the rotor to an optimal rotor speed, according to one example embodiment.

Referring now also to FIG. 3 in the drawings, a system 301 is illustrated in conjunction with rotorcraft 101. It should be appreciated that though system 301 is illustrated with regard to rotorcraft 101, system 301 is equally implementable on tilt rotor aircraft 201, as well as other aircraft. Further, it should be appreciated that system 301 can be implemented in a wide variety of configurations, depending in part on the flight control configuration of the aircraft.

System 301 is particularly well suited for implementation in aircraft having a fly-by-wire flight control computer, such as flight control computer 125; however, non fly-by-wire aircraft can also utilize system 301. For example, system 301 can be utilized in a flight control system having collective actuators that can receive commands from a trim motor, autopilot system, or any other system that allows collective commands to be realized by collective actuators. Further, system is particularly well suited for implementation with aircraft having an engine controlled by an engine control unit 127, such as a FADEC (full authority digital engine control) system. However, system 301 can also be implemented on an aircraft having an engine that is not controlled by an engine control unit 127, in such an embodiment, system 301 can make fuel control commands directly to a fuel control unit 129, for example.

System 301 is configured to command the rotor speed to an optimal rotor speed by calculating power available based upon engine parameters, engine limits, gearbox limits, and rotor parameters. The calculated optimal rotor speed can be a setpoint for a rotor speed governor. Further, system 301 is configured to calculate and command an optimal rotor speed (max performance) using a combination of collective rotor pitch governing and engine governing. Further, system 301 is particularly well suited for calculating and commanding an optimal rotor speed during an OEI (one engine inoperable) condition on a multi-engine rotorcraft; however, system can also be utilized to calculate and command an optimal rotor speed during normal engine operating conditions for both single engine and multi-engine aircraft.

System 301 is preferably integrated with flight control computer 125; however, in another embodiment system 301 can be a standalone computer system within the aircraft.

System 301 can include a processor 303 configured for processing receivable data in an algorithm 501 and subsequently making commands to adaptively affect rotor speed. Processor 303 can receive real time operational data from sensors, instrumentation, and the like. Processor 303 can receive real time data pertaining to an engine exhaust temperature (MGT) 305, a transmission (i.e. gearbox 115) torque (Qe) 307, an engine gas generator speed (Ng) 309, and a rotor speed (Nr) 311. Allowable engine limits, such as an engine exhaust temperature (MGT) limit 313 and an engine gas generator speed (Ng) limit 317, as well as a transmission (i.e. gearbox 115) torque (Qe) limit 315, are in data communication with processor 313. Allowable engine limits 313, 317, and transmission limit 315, can be stored in a database within processor, or be stored remotely, as long as limits 313, 315, and 317 are available for the analysis. Processor 303 is configured to perform analysis using an optimization algorithm 501 and subsequently make a rotor pitch command 315 and/ or an engine speed command 317.

Figure 5:
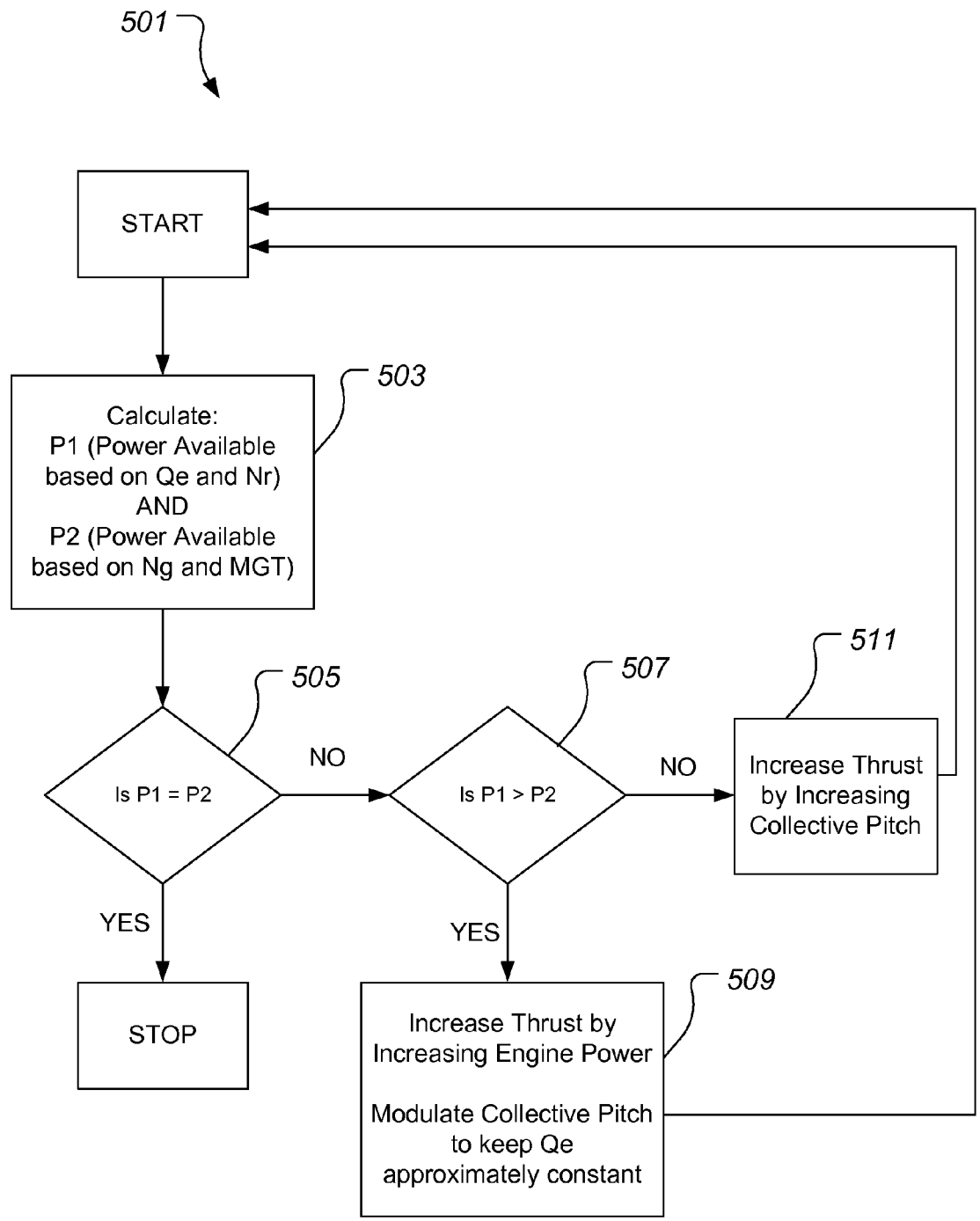
FIG. 5 is a schematic view of a method for calculating and commanding the rotor to an optimal rotor speed, according to one example embodiment.

Referring now also to FIG. 5, algorithm 501 is schematically illustrated. Algorithm 501 can be performed when either the actual transmission torque (Qe) 307 is approximately limited at the transmission torque (Qe) limit 315, or when an engine parameter, such as the engine exhaust temperature (MGT) 305 or the engine gas generator speed (Ng) 309 is approximately limited at the engine exhaust temperature (MGT) limit 313 or the engine gas generator speed (Ng) limit 317, respectively. Flight control computer 125 can be configured to increase power (i.e. thrust) on demand by increasing engine and/or rotor speed until one of the above limits is reached, at which point in time algorithm 501 can be performed to dictate steps to further utilize power available.

Algorithm 501 includes a step 503 for calculating power available P1 based upon transmission torque (Qe) and rotor speed (Nr) by comparing each of Qe and Nr to their respective limits. Further, step 503 can include calculating power available P2 based upon engine gas generator speed (Ng) and engine exhaust temperature (MGT) by comparing each of Ng and MGT to their respective limits.

A step 505 analyzes whether P1 is equal to P2. If the result of step 505 is yes, then the algorithm stops. If the result of step 505 is no, then the algorithm proceeds to step 507. Step 507 analyzes whether P1 is greater than P2. If the result of step 507 is yes, then the algorithm proceeds to step 509. Step 509 includes increasing thrust by increasing engine power. Step 509 can include modulating collective pitch to keep transmission torque (Qe) approximately constant. As a result to increasing engine power in step 509, thrust increases, rotor speed (Nr) increases, transmission torque (Qe) remains constant, engine exhaust temperature (MGT) increases, and engine gas generator speed (Ng) increases. However, the power is not increased to the extent that would cause any of the limits associated with Nr, Qe, MGT, or Ng to be exceeded. The increase in engine power, and consequently rotor speed (Nr), can be implemented by increasing the amount of fuel sent to engine 113. The algorithm can proceed back to start.

If the result of step 507 is no, then the algorithm proceeds to step 511. Step 511 includes increasing thrust by increasing collective pitch. As a result to increasing collective pitch, transmission torque (Qe) increases, rotor speed (Nr) decreases, engine power remains constant, engine exhaust temperature (MGT) remains constant, and engine gas generator speed (Ng) remains constant. However, the collective pitch is not increased to the extent that would cause transmission torque (Qe) to exceed the transmission torque (Qe) limit. The algorithm can proceed back to start.

Figure 6:
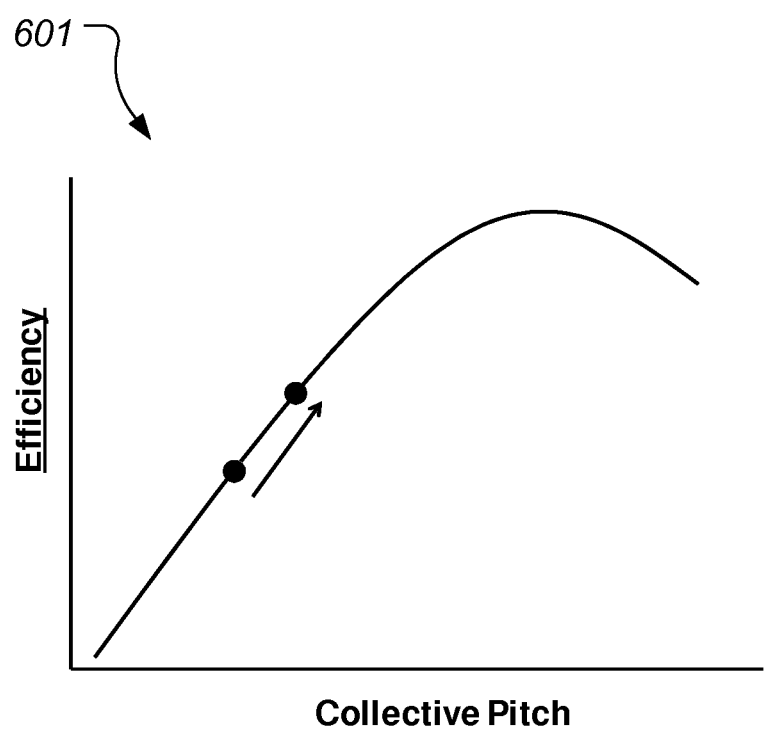
FIG. 6 is a graph of a relationship between efficiency and collective pitch, according to one example embodiment.

Referring briefly to FIG. 6, a graph 601 graphically depicts an exemplary relationship between efficiency and collective pitch, and thus how an increase in collective pitch can improve aerodynamic efficiency, thereby providing a net thrust increase even though the rotor speed (Nr) is decreased.

Implementation of system 301 and method 501 can optimize performance of an aircraft by governing rotor speed in accordance with a given power available. In the preferred embodiment, the optimal rotor speed is calculated and governed automatically and seamlessly so that pilot selection is not required. Further, the optimal rotor speed can be calculated and governed during all operating conditions and flight envelopes such that increased performance in one area of the flight envelope does not result in decreased performance in another area of the flight envelope. Further, the optimal rotor speed can be anywhere within a specified range, rather than a few specified values. For example, if the specified rotor speed ranges from 92% to 105% (100% being nominal rotor speed), then the governed rotor speed can be anywhere with the range. However, the system and method can include methodology to prevent the rotor speed from dwelling at a resonant frequency.

Another advantage of system 301 and method 501 includes the increase of aircraft gross weight capability. In the case of a two engine aircraft, the aircraft is conventional certified in accordance with the performance capability in a one engine inoperably (OEI) state. For example, a "Category A" certification can define how the aircraft can perform in an OEI condition. For example, "Category A" certification can outline how the aircraft would land safe or fly safe in an OEI condition. Such a "Category A" certification can be a limiting factor in the allowable gross weight determination for a certain flight regime. However, implementation of system 301 and method 501 allows the aircraft to take advantage of additional power available and increase thrust during the OEI condition, thereby increasing the allowable gross weight of the aircraft.

Figure 7:
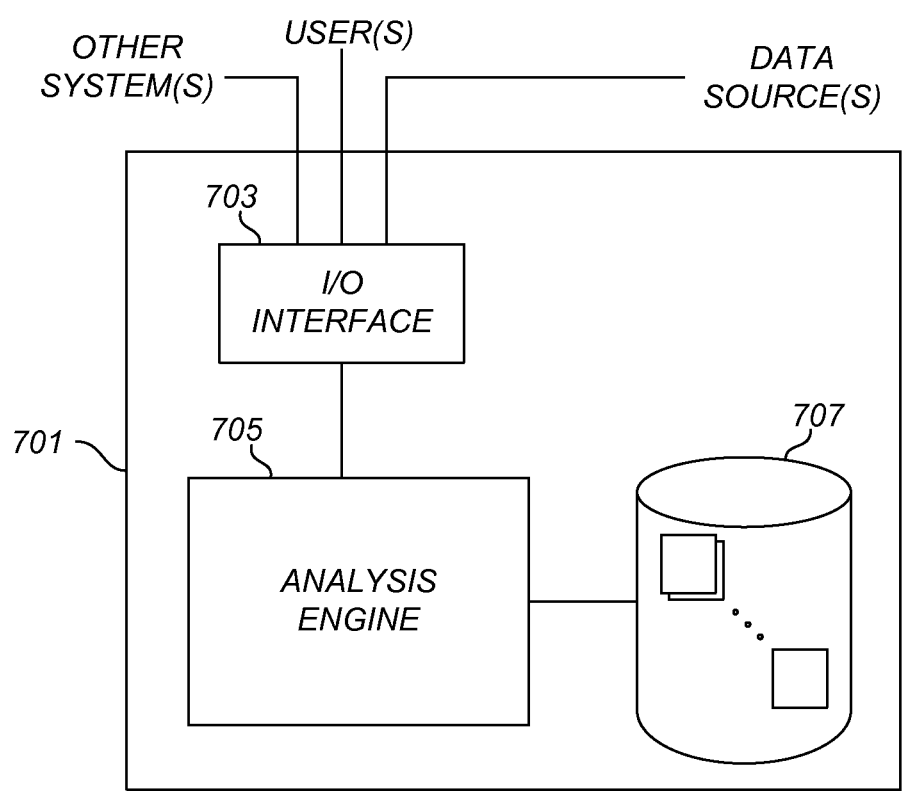
FIG. 7 is a schematic view of a computer system, according to example embodiment.

Referring now also to FIG. 7, a computer system 701 is schematically illustrated. System 701 is configured for performing one or more functions with regard to the operation of system 301 and algorithm 501, further disclosed herein. Further, any processing and analysis can be partly or fully performed by computer system 701. Computer system 701 can be partly or fully integrated with other aircraft computer systems.

The system 701 can include an input/output (I/O) interface 703, an analysis engine 705, and a database 707. Alternative embodiments can combine or distribute the input/output (I/O) interface 703, analysis engine 705, and database 707, as desired. Embodiments of the system 701 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 703 can provide a communication link between external users, systems, and data sources and components of the system 701. The I/O interface 703 can be configured for allowing one or more users to input information to the system 701 via any known input device. Examples can include a keyboard, mouse, touch screen, and/or any other desired input device. The I/O interface 703 can be configured for allowing one or more users to receive information output from the system 701 via any known output device. Examples can include a display monitor, a printer, cockpit display, and/or any other desired output device. The I/O interface 703 can be configured for allowing other systems to communicate with the system 701. For example, the I/O interface 703 can allow one or more remote computer(s) to access information, input information, and/or remotely instruct the system 701 to perform one or more of the tasks described herein. The I/O interface 703 can be configured for allowing communication with one or more remote data sources. For example, the I/O interface 703 can allow one or more remote data source(s) to access information, input information, and/or remotely instruct the system 701 to perform one or more of the tasks described herein.

The database 707 provides persistent data storage for system 701. While the term "database" is primarily used, a memory or other suitable data storage arrangement may provide the functionality of the database 707. In alternative embodiments, the database 707 can be integral to or separate from the system 701 and can operate on one or more computers. The database 707 preferably provides non-volatile data storage for any information suitable to support the operation of system 301 and method 501, including various types of data discussed further herein. The analysis engine 705 can include various combinations of one or more processors, memories, and software components.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of adaptively governing a rotational speed of a rotor in an aircraft, the method comprising:
    calculating a first power available with a processor by comparing an actual transmission torque to a transmission torque limit;
    calculating a second power available with the processor by comparing an actual engine exhaust temperature to an engine exhaust temperature limit;
    comparing the first power available to the second power available;
    increasing a thrust of the rotor by at least one of:
        increasing an engine power in response to the first power available being greater than the second power available; and
        increasing a collective pitch of a plurality of rotor blades in response to the first power available being less than the second power available.

2. The method according to claim 1, wherein the step of calculating the first power available further includes comparing an actual rotor speed to a rotor speed limit.

3. The method according to claim 1, wherein the step of calculating the second power available further includes comparing an actual engine gas generator speed to an engine gas generator speed limit.

4. The method according to claim 1, wherein when increasing the thrust of the rotor by increasing the engine power in response to the first power available being greater than the second power available, then also modulating the collective pitch of the plurality of rotor blades to keep the actual transmission torque approximately constant.

5. The method according to claim 1, wherein when increasing the thrust of the rotor by increasing the engine power in response to the first power available being greater than the second power available is accomplished by increasing a fuel flow to an engine.

6. The method according to claim 1, wherein when increasing the thrust of the rotor by increasing the engine power in response to the first power available being greater than the second power available results in an increase in a rotational speed of the rotor.

7. The method according to claim 1, wherein when increasing the thrust of the rotor by increasing the engine power in response to the first power available being greater than the second power available is limited by a rotor speed limit.

8. The method according to claim 1, wherein when increasing the thrust of the rotor by increasing the engine power in response to the first power available being greater than the second power available is limited by an engine exhaust temperature limit.

9. The method according to claim 1, wherein when increasing the thrust of the rotor by increasing the engine power in response to the first power available being greater than the second power available is limited by an engine gas generator speed limit.

10. The method according to claim 1, wherein when increasing the thrust of the rotor by increasing the collective pitch of a plurality of rotor blades in response to the first power available being less than the second power available results in an decrease in a rotational speed of the rotor.

11. The method according to claim 1, wherein when increasing the thrust of the rotor by increasing the collective pitch of a plurality of rotor blades in response to the first power available being less than the second power available is limited by a transmission torque limit.

12. The method according to claim 1, wherein when increasing the thrust of the rotor by increasing the collective pitch of a plurality of rotor blades in response to the first power available being less than the second power available results in an increase in an actual transmission torque.

13. The method according to claim 1, wherein the rotor is a main rotor assembly on a rotorcraft.

14. The method according to claim 1, wherein the rotor is a rotor assembly on a rotatable nacelle on a tilt rotor aircraft.

15. A system for adaptively governing a speed of a rotor assembly in an aircraft, the system comprising:
 a processor;
 a plurality of sensors configured for measuring the receivable data; and
 an actuator system configured for making a collective pitch change to a plurality of rotor blades in the rotor assembly;

wherein the processor is configured to:
 calculate a first power available by comparing at least one of:
  an actual transmission torque to a transmission torque limit; and
  an actual rotor speed to a rotor speed limit;
 calculate a second power available by comparing at least one of:
  an actual engine exhaust temperature to an engine exhaust temperature limit; and
  an actual engine gas generator speed to an engine gas generator speed limit;
 wherein the processor is also configured make a collective pitch change command when the first power available is less than the second power available, and wherein the processor is configured to make an engine power change command when the first power available is greater than the second power available.

16. The system according to claim 15, further comprising:
 an engine control unit configured for changing a speed of an engine.

17. The system according to claim 15, wherein the aircraft is a rotorcraft.

18. The system according to claim 15, wherein the aircraft is a tilt rotor aircraft.

* * * * *